June 13, 1950 G. OLAH 2,511,479
COOLING MEANS FOR REDUCTION GEARING
Filed June 19, 1946 2 Sheets-Sheet 1

Inventor
GEORGE OLAH
By Mock & Blum
Attorneys

June 13, 1950 G. OLAH 2,511,479
COOLING MEANS FOR REDUCTION GEARING
Filed June 19, 1946 2 Sheets-Sheet 2

Inventor
GEORGE OLAH
By Mock & Blum
Attorneys

Patented June 13, 1950

2,511,479

UNITED STATES PATENT OFFICE 2,511,479

COOLING MEANS FOR REDUCTION GEARING

George Olah, Ealing, London, England, assignor to Precision Developments Company Limited, London, England, a company of Great Britain and Northern Ireland Application June 19, 1946, Serial No. 677,715
In Great Britain June 28, 1945

14 Claims. (Cl. 74—606)

This invention relates to gear drives, especially of the type comprising a gear wheel which is of relatively large diameter compared with its width, and in particular to worm gear drives. It is an object of the present invention to provide improved gear drives of this character, which include improved means for effectively dissipating the heat generated in the drive. Another object of the invention is to provide an improved gear drive of this character capable of withstanding heavier loads than those permissible for similar drives of a customary construction. According to one aspect of the invention, a gear drive comprises a casing, co-operating gear elements in said casing, one of said gear elements being relatively large in diameter compared with its width, and said casing having portions closely adjacent laterally to the two sides of the said gear element of relatively large diameter over a substantial portion of the area of said sides. Other aspects of the invention will become apparent as the description proceeds and will be set forth in the claims.

Figure 1:
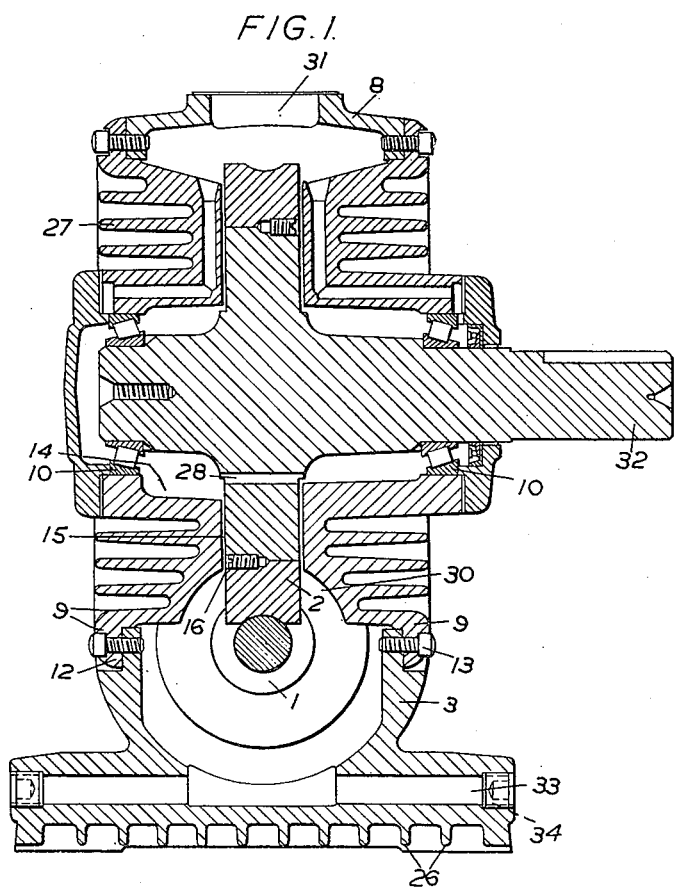
Figure 2:
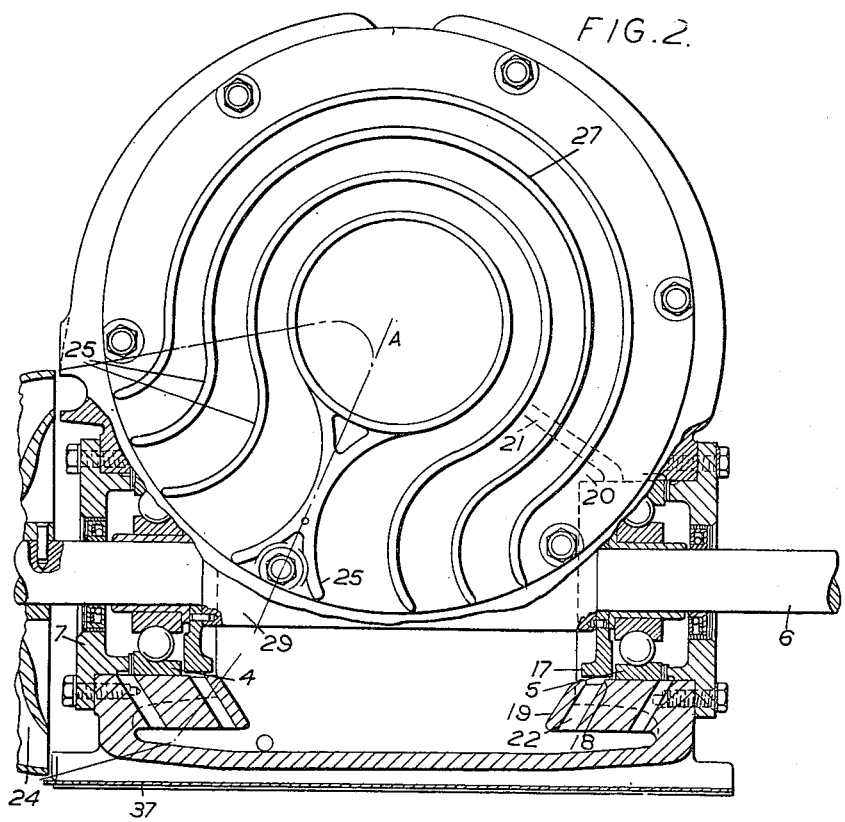
Figure 3:
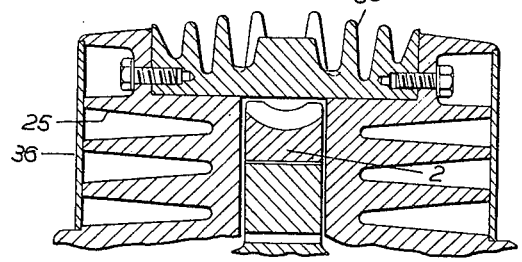

In order that the invention may be more readily understood, two forms of a worm gear drive incorporating the invention will now be described by way of example with reference to the accompanying drawings in which Fig. 1 is an elevation in vertical section through the worm wheel shaft of a worm gear drive according to the invention. Fig. 2 is an elevation at right-angles thereto, partly in section, and Fig. 3 is a partial view, in section similar to Fig. 1, of a modification. Referring now first to Figs. 1 and 2, the worm 1 and worm wheel 2 are enclosed in a casing consisting of three parts. A central part 8 contains a horizontal bottom portion 3 accommodating the worm 1 and the bearings 4 and 5 for its shaft 6, which are combined thrust and journal ball bearings, sealing flanges 7 being provided outside each bearing to close the opening through which the bearing is accessible and prevent oil from leaking along the shaft. The upper portion of the central part 8 forms a ring surrounding the periphery of the worm wheel 2 with some clearance but is substantially wider than the worm wheel so that where the worm wheel enters the worm casing 3, the ring is continued in the side walls of the latter; the bottom portion of this part 3 serves as an oil sump. Two cover parts 9 each containing a conical roller bearing 10 for the shaft 11, of the worm wheel 2 fit into this ring from either side and are secured to the centre part 8 by flanges 12 and bolts 13. The roller bearings 10 are mounted at the bottom of a central recess 14 in each cover which forms a pocket accommodating the adjacent end of the worm wheel hub, while outside this pocket the cover has a machined surface 15 which extends parallel to the adjacent face of the worm wheel, from which it is separated only by a narrow gap 16. The optimum width of this gap depends on various conditions such as the rate of rotation of the worm wheel, the viscosity characteristic of the oil and its expected temperature in the gap, but it may be taken as some indication that in the case of a worm wheel running at 40 revs. per min. and about 18″ in diameter a gap of .01″ to .03″ should generally give satisfactory results. Oil pumps may be provided at one, or as shown, at both ends of the worm 1 adjacent to the bearings 4 for the worm shaft 6. Each pump consists of a wheel 17 somewhat larger in diameter than the worm, which at its lower side extends into the oil sump and is surrounded with some clearance, for example ⅛″, by a groove 18 in a portion of the casing which near its highest point has a stripper portion 20 across this groove, a passage 21 being provided from a point in front of the stripper portion to the pocket surrounding the hub of the worm wheel. Another "land" across groove 18 is preferably provided at its lowest point, at which an intake passage 22 is preferably provided, so that the circumference of wheel 17 passes this land before reaching passage 22. Oil adhering to the wheel will collect in front of stripper portion 20 and thence is conducted to the pockets under pressure if necessary, keeping up in the pockets 14 a continuous supply of oil. The narrow gaps 16 between the faces of the worm wheel 2 and the adjacent machined surfaces 15 of the cover parts 9 are therefore always filled with oil, ensuring the conduction of heat from the worm wheel to the casing.

A fan 24 is mounted on one end of the worm shaft, and high fins 25, similar to those on the cylinder of an air-cooled motorcycle engine, are arranged on the casing. Fins 26 at the bottom of the central portion 8 are substantially parallel to the central plane of the worm wheel, while the fins 25 on the lateral surfaces are substantially co-axial with the worm wheel shaft at the upper portion of the casing, and are so shaped at its lower portion as to conduct the air flow from the fan 24 upwards, then between their circular portions 27, down at the other side of the shaft, and out opposite to the fan. The channels formed by the fins may be covered if desired with a light outer covering to obtain more positive conditions of flow. A branch flow of air is diverted downwards, where a suitable channel is formed for it by ribs 26 under the sump.

Some cross bores 28 are preferably provided in the worm wheel 2 near its hub to allow oil from one side to pass to the other so as to maintain the supply of oil to the gaps 16 at both sides of the worm wheel even if for some reason one or the other of the two oil pumps should at any time fail to work.

If desired, circular ribs parallel to the centre diplane of the worm wheel 2 may also be arranged to surround the centre portions of the housing, a branch flow of cooling air from the fan 24 being diverted round the periphery of the casing in this case.

As shown in chain-dotted lines in Fig. 2, hoods 29 are provided at both sides of the worm gear housing which serve to conduct cooling air from fan 24 to the passages between the entrance ends of conductor fins 25.

It is often desirable to use the same parts for a worm gear of the same dimension irrespective of whether the shaft of the worm wheel is to project from one side or the other of the casing. This can be achieved with the arrangement according to the invention as illustrated owing to the fact that not only the cooling ribs but also the bolt holes are arranged symmetrically to a line A. As will be seen from Fig. 1, a recess 30 is provided in the cover member 9 to accommodate the worm 1. In order to permit the use of the same parts for worm gears having the driven shaft projecting at either side, each cover plate 9 has a second identical recess arranged symmetrically to the first recess 30 with respect to line A.

With this arrangement the two cover parts 9 may be interchanged according to whether the shaft 32 of the worm wheel 2 is desired to project on one side or the other. It should be understood that the invention may be carried out different in a number of details from the example described. It has been found for example, that the provision of the oil pumps 17 is not always required, provided that the level of oil in the sump is maintained sufficiently high, or that these pumps may for example be replaced by ordinary splash rings fixed on and rotating with the shaft, provided that the maintenance of an oil film between the worm wheel and the housing in the gaps 16 is reasonably assured in view of the dimensions and the normal rate of rotation of the parts and the viscosity of the oil employed.

Lubricating oil may be inserted into the worm gear casing through an opening 31 whenever required, while a draining passage 33, normally closed by a suitable plug 34, is provided at the bottom of the sump to facilitate renewal of the lubricating oil.

Fig. 3 shows a modified form of the worm gear drive, in which, in order to increase the rate of dispersal of heat, cooling fins 35 are arranged around the periphery of the worm wheel housing in planes parallel to the centre plane of the worm wheel. A cover plate 36 is shown in this example to be placed on top of the cooling fins 25 so as to form with the latter closed passages for the coolant, and similarly a cover plate may be arranged to surround the periphery of the worm wheel housing, forming closed passages round the housing in co-operation with the cooling fins 35. In both cases the cover parts 9 are preferably made of a light metal or a light alloy.

There are a number of very definite advantages presented through the arrangement thus described; a few of these will now be referred to in detail:

As is well known, the heat developed during the operation of worm and worm wheel constructions, while actively rotating, is due to the friction developed by the movement of the teeth of the worm in contact with the teeth of the wormwheel in providing the drive relation therebetween, the direction of length of the worm teeth traversing the teeth of the worm gear in the direction of width of the worm gear, thus setting up a sliding frictional contact conducive to the development of heat in the contact zone even under comparatively slow speed conditions. The developed heat is transmitted instantly to the worm and worm-gear bodies so that these reach undesired temperatures and it is essential that these temperatures be kept as low as possible.

The worm body condition is readily solved by locating the worm within an oil sump, the practice generally followed, since the worm is generally located at the bottom of the assemblage. The conditions relative to the worm gear are not so easily solved, although it has been contemplated to duplicate the worm solution by arranging the assemblage in such way that the worm gear is also mounted to have its movements within a volume of oil such as to simulate the oil bath conditions present within the sump. This latter practice, however, has proven somewhat unsatisfactory, due to the fact that if its content be independent of the sump, and thus somewhat static, the oil gradually becomes heated and thus tends to increase the difficulty. If it is in circulation with the sump, the apparatus required to provide the circulation becomes too large and costly as to justify its use for this specific condition.

Recourse has been had to the use of external fins on the casing or housing within which the worm wheel is mounted, but the efficiency value is greatly reduced, due to the fact that the heat from the wheel must be conducted through space to reach the housing, since the gear wheel cannot travel in contact with the housing without creating additional friction and heat. If the air is static within the space, it rapidly becomes heated, and it is impracticable to attempt any material circulation of air between the wheel and the housing, for obvious reasons, the space necessarily being enclosed.

The present invention is designed to remedy many of these conditions. For instance, the usual sump takes care of the worm body heating, and the casing or housing is provided with external fin formation of a particular arrangement and type and the relationship between the interior of the casing or housing and the worm wheel is of special arrangement and type. In effect, an oil pocket is formed in the axial zone of the wheel and a channel characteristic is provided leading from the pocket in the direction of the sump. The channel characteristic is provided by bringing the inner wall of the portion of the housing below the pocket and above the sump into proximity to but spaced from the side face of the wheel. Such spacing is less than 0.050″, a distance which will prevent the development of any friction between the wall face and the gear, and will provide a channel through which oil can pass from the pocket to the sump by gravitation, the width of the gap therebetween being little larger than that for producing a film. It can be termed an exaggerated film, but being sufficient to assure free movement of oil downwardly therethrough. The zone above the wheel hub is equipped with a similar gap, but since the oil pocket is below such upper gap, it is not an oil flow path, excepting the possibility that the face of the worm gear wheel may carry with it a slight coating of oil as it passes out of the lower gap, and if this is sufficient to trickle downward, while the wheel zone is in the upper gap, the latter would permit its return to the pocket. Suitable means are provided for moving oil from the sump to the oil pocket, from where it returns to the sump by gravitation, thus providing an oil circulation which extends through the lower gap.

The cover part 9 which presents the face of gap 16 opposite the side face of the worm gear, has its fins provided by the formation of deep depressions, so that the outer ends of the fins do not project beyond the outer plane of the part, the depression depth serving to provide the inner wall of the part as comparatively thin as compared to the overall thickness dimension of the part, the result being that when the fins are being bathed by the air coolant, as described, such inner wall tends to remain cool with any heat therein being rapidly dissipated into the fin zone and subject to the effect of the air bathing within the fin zone.

The opposing faces of gap 16 thus present materially different temperatures, a condition conducive to a rapid transfer of heat through the oil content of the gap. The small width dimensions of the gap with consequent thin thickness of the moving oil therethrough, the exaggerated film effect referred to, is very efficient in such heat transfer. By being normally cooler than the heated worm gear, it will absorb heat quickly and thus become heated with respect to the temperature of the inner wall of part 9, thus providing rapid transfer of heat from the oil to such inner wall. The thin moving oil flow thus provides a very sensitive medium for the heat transfer from the worm gear to the fin zone. And since the gap width is uniform, due to the machining of the opposing faces, this sensitive status is also uniform throughout the vertical height of the gap.

This advantage is of increased value through the location of the gap in near approach to the source zone of heating so that the heat transfer is made effective in rapid succession to its development, with the heat transfer action throughout the area of the opposed faces below the top level of the inner face of part 9, since the oil level within the pocket is materially above such point and the oil is unobstructed throughout such areas. The oil in the gap will be quickly heated due to the thin dimensions of the gap, an advantage through increasing the differential in temperature between the oil and inner face of part 9, thus providing for the rapid transfer of heat to the latter. As a result, the oil within the gap, while rapidly heated therein, leaves the gap at reduced temperature and enters the sump under the latter conditions, thus having no material effect in increasing the temperature of the oil within the sump.

While the gap also extends above the hub zone of the worm gear, and the face of the gear may be wetted by an oil film, the oil does not contact the inner face of the upper part of part 9 similar to the lower part of the gap. However, this portion of the gap is remote from the point of development of the heat, and the heat must, therefore, first traverse the zone which is being subject to the intensive heat transfer presented in the lower gap zone. Hence, the air within the upper gap zone is able to provide any needed transfer without undue heating, any surface film on the gear aiding in this respect.

As indicated in Fig. 2, the open ends of the entrance to the deep fin depressions is located in proximity to fan 24 so that the greater coolant effect on the fins is placed in the zone of the lower gap, thereby increasing the temperature differential between the oil traversing the gap and the fins of the zone to thereby increase the rapidity of heat transfer from the oil. Since the coolant is constantly advancing through the concentric paths to be discharged through the discharge ends more remote from the fan, the coolant is being supplied in such manner as to be most efficient in setting up this differential. While the discharge ends of the depressions are also in the vicinity of the heating zone, this is not detrimental, since the structures are duplicated on the opposite side of the worm gear, with the open ends of the depressions located relative to the fan 24 in similar manner. Hence, the fan air travels in opposite directions on opposite sides of the worm gear, clockwise in the Fig. 2 side and counterclockwise on the opposite side.

As will be understood, the assemblage thus produced provides an exceedingly efficient structure for this particular service, although of compact form, this result being brought about by the rapid heat transference under conditions of the sensitive transfer oil of the gap and the location of the gap to be effective in the vicinity of the point of origin of the heat. With the oil in the lower gaps being under circulating conditions, the momentary heating of a particular increment is not damaging to the oil since the heating is not sustained.

I claim:

1. In worm and worm gear assemblages, wherein the worm and worm gear are housed and mounted for service rotation, and wherein the housing includes external fin assemblies, an assemblage of such type characterized in that the worm is mounted within an oil sump with the worm gear mounted thereabove, said housing having an oil pocket within the worm gear hub zone and spaced from the sump, and means for forcibly transferring oil from the sump to the pocket, said housing also having a face extending parallel with each side face of the worm gear and in close relation thereto but spaced therefrom, said face extending from walls of said pocket outwardly in radial directions relative to the axis of the worm gear hub with a zone of the face located between the pocket and sump, said zone cooperating with the adjacent side face of the gear to form a gap channel between the pocket and sump with the channel having a width to permit free passage of oil from the pocket by gravitation and in exaggerated film dimension form to thereby create a moving heat-exchange medium active between the opposing faces of the gap oil channel and by circulation of oil between the sump and pocket.

2. An assemblage as in claim 1 characterized in that the channel opposing faces of each gap are machined to provide uniform distance between gap walls, the gap oil channel being active throughout the gap area below the surface level of the oil within the pocket.

3. An assemblage as in claim 2 characterized in that said gap oil channels extend downward in the direction of the periphery of the worm gear with the lower limits approaching but spaced from the zone of coaction between the teeth of the worm and gear to thereby locate the moving heat-exchange medium in the vicinity of heat development by the coacting teeth.

4. An assemblage as in claim 1 characterized in that the external face of the wall of the housing is formed with a plurality of deep parallel depressions extending in loop form to provide external fin ribs corresponding in depth to the depth of the depressions, the depth of the latter being such as to provide the wall thickness of the gap oil channel face as materially less than the depth of the fin ribs thereof to thereby cause rapid heat exchange action between the worm gear and housing through the gap oil channels.

5. An assemblage as in claim 4 characterized in that the internal face of the housing below the lower limits of the gap oil channel are recessed to thereby permit the discharging oil from the channel to freely fall into the path of travel of the worm thread zone in moving to the sump.

6. A gear drive assemblage comprising a casing having cooling means for the outer side thereof, a pair of shafts mounted in the casing with their respective axes extending on spaced parallel horizontally-extending planes, each shaft carrying a gear element within the casing with the pair of gears in cooperative relation, the lower gear element of the pair extending into an oil sump within the casing, an oil pocket within the casing in spaced relation to the sump, said pocket being positioned in the vicinity of the axial zone of the upper gear element, means for forcibly supplying oil from the sump to said pocket, said casing having portions consisting of heat conducting material and having planar faces spaced in parallel relation to the side faces of the upper gear intermediate the pocket and the sump, the distance spacing of the parallel intermediate faces of gear and casing presenting an open vertical channel of narrow spacing distance and of film like characteristic connecting the pocket zone and the sump zone to thereby render the channel active as a path for downward flow of oil from the pocket to the sump by gravitation.

7. An assemblage as in claim 6 characterized in that the respective gears are of worm and worm-wheel type with the worm-wheel positioned as the upper gear of the assemblage and with the wheel having side faces generally planar and cooperative with casing faces in producing the down flow channel formation.

8. An assemblage as in claim 6 characterized in that the length of the channel in the direction of a radius of the upper gear side face is located within an intermediate zone of such gear radius and is of substantial length and with the spacing dimensions between the opposing faces of gear and casing less than fifty thousandths of an inch.

9. An assemblage as in claim 8 characterized in that the spacing distance between the planar walls of the channel is within a range limit of one hundredth and three hundredths of an inch.

10. An assemblage as in claim 9 characterized in that the opposing planar walls of the channel are presented as machine-finished to thereby render the channel of uniform spacing dimensions in the direction of down-flow of the oil.

11. An assemblage as in claim 6 characterized in that the areal dimensions of the casing wall of a channel are of substantial and material amount to thereby present a channel oil downflow path of extensive area to constitute the flowing oil as an active heat-exchange agency between the upper gear and the casing remote from the toothed zone of the gear.

12. A gear drive comprising a casing, cooling means for the outer side of said casing, shafts mounted in said casing, cooperating gear elements mounted respectively on said shafts, said casing having portions consisting of heat conducting material and arranged closely adjacent but spaced from the sides of at least one gear element to thereby provide an oil flow channel therebetween with the channel oil active as a heat-conducting agency between the gear and the external cooling means, the outer side of said casing having a plurality of deep depressions extending in parallelism to thereby provide external fins, the direction of length of the fins including an intermediate zone in which the fins extend in looped form concentric with the axis of rotation of the gear, and with the ends of the fins symetrically disposed relative to each other in the vicinity of the lower end of the casing.

13. A gear drive as in claim 12 characterized in that the casing carries a fan impeller axially aligned with the gear shaft and positioned remote from the gear, the ends of the looped fins and their deep depressions being positioned in the path of the coolant when being discharged from the impeller, the fins of the looped zone being asymmetric to a vertical plane through the mid-zone of the gear axis.

14. A gear drive as in claim 13 characterized in that the entering ends of the fins are located within the zone of the housing which presents the outer side of the gap oil channel.

GEORGE OLAH.

REFERENCES CITED

The following references are of record in the file of this patent:

UNITED STATES PATENTS

| Number | Name | Date |
|---|---|---|
| 1,090,383 | Cantrell | Mar. 17, 1914 |
| 2,099,883 | Graham | Nov. 23, 1937 |
| 2,184,345 | Hersey | Dec. 26, 1939 |
| 2,340,707 | Staley | Feb. 1, 1944 |

FOREIGN PATENTS

| Number | Country | Date |
|---|---|---|
| 15,780 | Great Britain | July 12, 1906 |
| 118,369 | Australia | Apr. 27, 1944 |
| 408,799 | Great Britain | Apr. 19, 1934 |
| 425,425 | Great Britain | Mar. 14, 1935 |
| 493,698 | Great Britain | Oct. 11, 1938 |
| 549,619 | Great Britain | Nov. 30, 1942 |